R. A. WELCH.
DRILL BIT.
APPLICATION FILED FEB. 28, 1911.

1,043,885.

Patented Nov. 12, 1912.

Witnesses

Inventor
Robert A. Welch
By his Attorney

UNITED STATES PATENT OFFICE

ROBERT A. WELCH, OF DOVER, NEW JERSEY.

DRILL-BIT.

1,043,885. Specification of Letters Patent. Patented Nov. 12, 1912.

Application filed February 28, 1911. Serial No. 611,360.

*To all whom it may concern:*

Be it known that I, ROBERT A. WELCH, a citizen of the United States, residing at Dover, in the county of Morris and State of New Jersey, have invented certain new and useful Improvements in Drill-Bits, of which the following is a specification.

My invention relates to the construction of drill bits for drilling rock, coal and the like and has for its object the provision of a bit having a drill face so constructed that when rotated all parts of the bottom of the boring will be engaged by the cutting edges to most effectually perform the operation.

My improved drill has a drill face oblong in shape with two parallel cutting edges forming the long sides of the oblong face and a cross cutting edge connecting the middle of the parallel edges.

Figure 1:
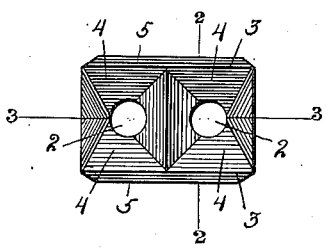
Figure 2:
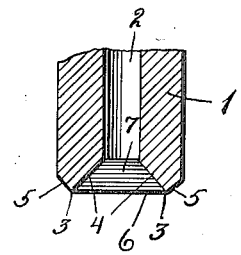
Figure 3:
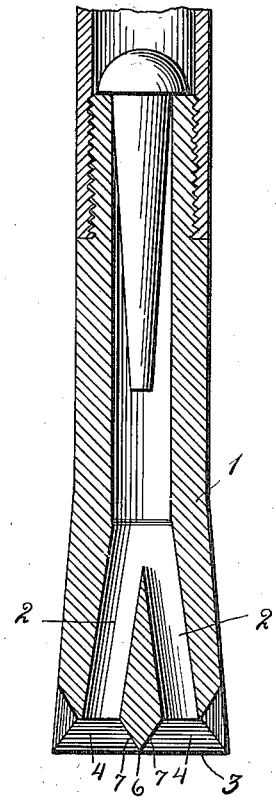

The details of construction of my improved drill will be described hereinafter and illustrated in the accompanying drawings in which:

Figure 1 is a plan view of the drill face of my improved drill bit, Fig. 2, a cross section, on the line $x$—$x$ of Fig. 1, and Fig. 3, a central longitudinal sectional view.

In the drawings similar reference characters will indicate corresponding parts in the several views.

My improved drill bit 1 may be made solid or provided with openings 2 through which the drillings may proceed upwardly through a tubular drill stem (not shown). The drill face consists of two parallel cutting edges 3 longer than the distance between the edges, so that the general shape of the cutting face is oblong. The cutting edges 3 are formed by bevel faces 4 extending inwardly from the edges and beveled edges 5 on the outer sides of the edges, the beveled edges 5 being formed by the dolly or sharpening tool.

6 indicates a cutting edge connecting the middle of the cutting edges 3 and having beveled sides 7.

In operation the drill stem is turned while in use so that all parts of the end of the boring will be engaged by the cutting edges and the work will be thoroughly accomplished.

The advantage of this form of bit is that regardless of the size of the bit required for drilling holes of various diameters, the cutting edge 6 is always the same length. By this construction the bits of different sizes may be sharpened by the same dolly used for the maximum size, as the edges of the dolly may project beyond the ends of the drill face.

Having thus described my invention what I claim is:—

A drill bit having an elongated drill face provided with cutting edges along its long sides and a short cutting edge extending transversely of the axis of the long cutting edges and connecting the centers thereof, whereby the length of the drill face may be varied without varying the length of the transverse cutting edge.

In testimony whereof I hereto affix my signature in the presence of two witnesses.

ROBERT A. WELCH.

Witnesses:
H. D. MOLLER,
CHAS. J. MOLLER.